United States Patent Office 2,752,397
Patented June 26, 1956

2,752,397
CARBONYLATION OF MONOOLEFIN-POLYOLEFIN MIXTURES

Arthur William Charles Taylor and Philip Geoffrey Harvey, Norton-on-Tees, England, assignors to Imperial Chemical Industries Limited, London, England, a corporation of Great Britain No Drawing. Application November 28, 1951, Serial No. 258,751

Claims priority, application Great Britain September 12, 1949

5 Claims. (Cl. 260—604)

This invention relates to the production of oxygen-containing organic compounds and is a continuation-in-part of application Serial No. 180,704, filed August 21, 1950, now abandoned.

It has previously been common practice in the carbonylation of olefines to employ as carbonylating gas a mixture of carbon monoxide and hydrogen in which the molar ratio $CO:H_2$ was 1:1 since this gives the stoichiometric proportions for direct addition to the double bond, but gas of this composition has a strongly corrosive effect on ordinary steel equipment. When the attempt is made to carbonylate alkenes containing also di- and/or poly-enes using less corrosive gas mixtures and a dissolved cobalt compound as catalyst it has now been found that carbonylation is inhibited, apparently owing to the presence of these last two classes of compounds. However, it has been found possible according to the present invention to carbonylate these mixtures by employing gas mixtures having certain ranges of composition, and certain concentrations of dissolved cobalt, together with certain operational steps, all as hereinafter defined.

It is an advantage of the process of the present invention that it makes possible the addition of CO and $H_2$ to alkenes containing di-enes and/or poly-enes that inhibit that addition, and that it does this using gas mixtures having such a composition that corrosion of ordinary steel equipment is kept to a minimum. Moreover, the conversions and yields obtained by its use are high and commercially economic. Furthermore, except in the case of mixtures in which the highest alkenes present are $C_4$ and $C_5$, the process is conducted without the addition of liquid media, so that the highest output is obtained from the carbonylation reactor and purification of the alcohol product obtained by subsequent hydrogenation is simplified.

It is another advantage that the invention makes possible the return of large quantities of hydrogen from the later carbonyl decomposition zone and from the hydrogenation step to the carbonylation step, and the use in the last mentioned step of a feed gas comprising water gas with a $CO:H_2$ molar ratio of 1:1, thus affording large over-all economies in the process.

The ability to use the low proportion of cobalt claimed as catalyst for the carbonylation of these difficult materials is important because the total amount of cobalt (which is expensive) in the system is kept low and consequently cobalt losses are kept low. The inhibiting effect of the di- and poly-enes is very marked when a soluble cobalt compound is employed as catalyst. The importance of the use of such a catalyst is that it makes possible very accurate continuous control of cobalt in the reaction space, which is extremely important in a sensitive reaction like the Oxo process, and that, in contrast to catalyst suspensions, the reaction mixture can be readily pumped and erosion of valves and choking of lines can be substantially eliminated.

According to the present invention oxygen containing compounds, especially aldehydes, are produced by carbonylating under super-atmospheric pressure and temperature olefines containing $C_4$ and higher alkenes, especially alpha-alkenes, together with di- and/or poly-enes, which may be alicyclic or aliphatic, by a process characterised in that: in a first stage the olefinic material is treated in the presence of at least 0.3% by weight of cobalt as catalyst dissolved in the liquid with a gas in which the molar ratio $CO:H_2$ is at least 2:3 until reaction is established, and thereafter in a second stage treatment is continued using a gas in which the molar ratio $CO:H_2$ is from 3:7 to 2:3, while maintaining the concentration of cobalt in dissolved form in the liquid at at least 0.1% by weight. The process is liquid phase.

It is a feature of the present invention that, except with $C_4$ and $C_5$ alkenes no auxiliary liquid is used in the first stage for the formation of the active carbonylating catalyst, but that a proportion of the alkene itself is used for this purpose. This is made possible by the use of relatively high $CO:H_2$ molar ratios, viz. at least 2:3, and a relatively high concentration of dissolved cobalt, viz. at least 0.3% by weight, in the first stage.

The process of the invention is specially applicable to mixtures containing from $C_4$ to $C_{18}$ mono-olefines, especially those containing up to 12 carbon atoms. Such mixtures may contain cyclic mono-olefines in appreciable amounts.

While the invention is not to be considered as depending on any particular theory, it is believed that di- and poly-enes, especially those which are conjugated, inhibit carbonylation. Di- and poly-enes, are distinguished by having higher densities and refractive indices than the corresponding mono-olefines, and their presence is indicated by refractive index measurement, infra red spectroscopy or density measurement.

Preferably the alkenes comprise $C_6$—$C_8$ normal mono-olefines, especially alpha-olefines, and with these compounds the temperature range may be 130°–190° C., with a preferred temperature range of 150°–175° C. and a suitable pressure of $CO/H_2$ mixture is 250 atmospheres gauge, although pressures of 200–300 atmospheres gauge are also suitable.

Preferably, the cobalt is introduced as a soluble salt of an organic acid dissolved in the liquid feed, e. g. cobalt naphthenate or cobalt acetate, laurate, hexahydrobenzoate, or 3,5,5-trimethyl hexoate. If desired soluble cobalt compounds may be introduced as a solution in a small amount of an inert medium, for example the alcohol product.

The process is of particular value in relation to the treatment of mixed olefines obtained by thermally cracking higher hydrocarbons, e. g. paraffin wax.

While $C_4$ and $C_5$ alkenes are liquid within partial ranges of the reaction conditions, it is nevertheless desirable with them to introduce an inert medium as well as the $C_4$ and $C_5$ alkene feed in order to permit liquid phase operation throughout the whole range of reaction conditions. Suitable inert media are, for example, saturated butene trimer, hydrogenated alcohol product, and high boiling residues comprising ethers and ether alcohols obtained by hydrogenation of the carbonylation product.

Saturated aldehydes produced by the process of the invention can be readily hydrogenated to the corresponding alcohol, using for example a copper or nickel catalyst and pressures of about 250 atmospheres. Copper-on-zinc oxide and copper-on-chromia are especially suitable catalysts for the hydrogenation step.

The invention is illustrated by the following example.

*Example*

(i) Operating according to the prior art process pure di-isobutene containing 0.1% of cobalt as naphthenate was fed to a reaction zone at 155° C. and 250 atmospheres pressure together with a mixture of carbon monoxide and hydrogen in which the molar ratio carbon monoxide:hydrogen was 1:3 in the proportion of 1000 cu. metres of free gas per cu. metre of di-isobutene, the liquid space velocity being 0.5 litre per litre of free reaction space per hour. Carbonylation was initiated immediately and there were obtained oxygenated organic compounds containing 3,5,5-trimethyl hexanal. When the inlet gas was cut off the reaction ceased, but restarted immediately on re-introduction of the carbonylating gas.

(ii) The process was repeated under the same conditions as given in paragraph (i) except that the di-isobutene feed was replaced by di-isobutene containing 5% of cyclopentadiene. After passing the same carbonylating gas for 2 hours it was found that no carbonylation had occurred.

(iii) Operation according to the process of the present invention will now be described using an alkene feed which trial showed could not be carbonylated under the conditions described in paragraphs (i) and (ii) above. A reactor is filled initially with $C_6$—$C_8$ alkene feed (obtained by the catalytic cracking of paraffin wax) containing 0.3% by weight of dissolved cobalt as naphthenate and treated with a mixed gas consisting of 40% CO and 60% $H_2$ at a pressure of 250 atmospheres, a temperature of 150–160° C., and a gas/liquid rate of 1000 cu. metres/cu. metre, while liquid of the above composition is fed continuously at a liquid space velocity of 0.5 litre/litre/hour to the reactor. After a short period reaction occurs as indicated by a rapid rise in temperature and fall in pressure, following which the concentration of the cobalt in the liquid feed is reduced to 0.1% by weight and the composition of the gaseous feed altered to 30% CO and 70% hydrogen. These conditions are then maintained and at a liquid space velocity of 0.5 litre/litre/hour, a temperature of 150–175° C. and a gas/liquid ratio of 1,000 cu. metres/cu. metre, the pass conversion to oxygenated products is about 80% by weight of the alkenes fed continuously to the reactor.

Preferably the partial pressure of carbon monoxide in the first step of the carbonylation process is at least 100 atmospheres.

Operating according to the process of the invention the main end products obtained, after hydrogenation of the carbonylation product, from $C_n$ normal olefines are the normal $C_n+1$ alcohol and the 2-methyl-$C_n$ alcohol. Thus normal heptanol and 2-methyl hexanol are obtained from normal hexene, and the corresponding normal and 2-methyl alcohols from normal heptene and octene. Other isomeric alcohols are also produced in minor amounts.

We claim:

1. A continuous process for the production of aldehydes by carbonylating in the liquid phase and in the presence of a dissolved organic cobalt compound as catalyst, an olefine mixture produced by the cracking of hydrocarbons and containing alkenes having at least four carbon atoms in the molecule and a minor amount of at least one olefine selected from the group consisting of aliphatic and alicyclic di- and poly-enes which comprises initially subjecting a large bulk of said olefine mixture to carbonylation with a carbon monoxide/hydrogen gas mixture having a $CO:H_2$ molar ratio of at least 2:3 in the presence of at least but not substantially greater than 0.3% by weight of cobalt metal dissolved in said mixture at a temperature of 130 to 190° C. and at a pressure of 200 to 300 atmospheres gauge until reaction is established, and thereafter introducing and continuously feeding to said bulk of olefine mixture, fresh olefine mixture together with a carbon monoxide/hydrogen gas mixture having a molar ratio of $CO:H_2$ of 3:7 to 2:3 at a temperature of 130 to 190° C. and at a pressure of 200 to 300 atmospheres gauge, while maintaining the concentration of cobalt in dissolved form in the liquid at a concentration of at least but not substantially greater than 0.1% by weight.

2. A process as claimed in claim 1 in which the partial pressure of carbon monoxide in the carbonylating gas used for the first step is at least 100 atmospheres.

3. A process as claimed in claim 1 in which the said alkene contains from 4 to 12 carbon atoms in the molecule.

4. A process as claimed in claim 1 in which the alkene is a mixture comprising $C_6$ to $C_8$ alkenes obtained by the thermal cracking of higher hydrocarbons.

5. A process as claimed in claim 1 in which the organic cobalt compound is the salt of a carboxylic acid.

References Cited in the file of this patent

UNITED STATES PATENTS

| | | |
|---|---|---|
| 1,982,536 | Perkins | Nov. 27, 1934 |
| 2,437,600 | Gresham et al. | Mar. 9, 1948 |
| 2,477,554 | McKeever | July 26, 1949 |
| 2,517,383 | Brooks | Aug. 1, 1950 |
| 2,530,989 | Parker | Nov. 21, 1950 |
| 2,544,271 | Liedholm | Mar. 6, 1951 |
| 2,587,858 | Keulemans | Mar. 4, 1952 |

OTHER REFERENCES

Wender et al.: "Critical Review of Chemistry of Oxo Synthesis," Bureau of Mines Report R. I. 4270, June 1948, pgs. 4, 5, 6.

Sachanen: Conversion of Petroleum, 2nd ed., Reinhold Publ. Co., New York, 1948 (pg. 1).